United States Patent
Varisco et al.

(10) Patent No.: US 9,988,044 B2
(45) Date of Patent: Jun. 5, 2018

(54) METHOD TO CONTROL A ROAD VEHICLE WITH STEERING REAR WHEELS WHEN DRIVING ALONG A CURVE

(71) Applicant: Ferrari S.p.A., Modena (IT)

(72) Inventors: Stefano Varisco, Modena (IT); Francesca Mincigrucci, Modena (IT)

(73) Assignee: Ferrari S.p.A., Modena (IT)

( * ) Notice: Subject to any disclaimer, the term of this patent is extended or adjusted under 35 U.S.C. 154(b) by 42 days.

(21) Appl. No.: 15/286,885

(22) Filed: Oct. 6, 2016

(65) Prior Publication Data

US 2017/0101088 A1    Apr. 13, 2017

(30) Foreign Application Priority Data

Oct. 7, 2015    (IT) .................. 102015000059217

(51) Int. Cl.
| | |
|---|---|
| *B60W 30/045* | (2012.01) |
| *B60W 10/16* | (2012.01) |
| *B60W 10/20* | (2006.01) |
| *B60W 10/22* | (2006.01) |
| *B60W 30/18* | (2012.01) |
| *B60W 30/188* | (2012.01) |

(52) U.S. Cl.
CPC .......... *B60W 30/045* (2013.01); *B60W 10/16* (2013.01); *B60W 10/20* (2013.01); *B60W 10/22* (2013.01); *B60W 30/188* (2013.01); *B60W 30/18145* (2013.01); *B60W 2520/00* (2013.01); *B60W 2520/10* (2013.01); *B60W 2520/14* (2013.01); *B60W 2520/26* (2013.01); *B60W 2710/125* (2013.01); *B60W 2710/207* (2013.01); *B60W 2710/226* (2013.01); *B60W 2720/406* (2013.01)

(58) Field of Classification Search
CPC .... B60W 30/045; B60W 10/16; B60W 10/20; B60W 10/22; B60W 30/18145; B60W 30/188; B60W 2720/406; B60W 2710/125; B60W 2710/207; B60W 2520/14; B60W 2520/00; B60W 2520/10; B60W 2520/26; B60W 2710/226
See application file for complete search history.

(56) References Cited

U.S. PATENT DOCUMENTS

| | | | | |
|---|---|---|---|---|
| 3,724,585 | A | * 4/1973 | Conrad ................ | B62D 7/1509 180/403 |
| 5,799,745 | A | 9/1998 | Fukatani | |
| 6,637,543 | B2 | * 10/2003 | Card ...................... | B62D 6/003 180/410 |
| 8,126,612 | B2 | * 2/2012 | Ahmed .................... | B62D 3/12 180/444 |

(Continued)

FOREIGN PATENT DOCUMENTS

| | | |
|---|---|---|
| DE | 11 2013 006 493 T5 | 11/2015 |
| EP | 0 728 644 A2 | 8/1996 |

(Continued)

*Primary Examiner* — Richard M Camby
(74) *Attorney, Agent, or Firm* — Blank Rome LLP (57) ABSTRACT

A method to control a road vehicle with steering rear wheels when driving along a curve. The control method comprises the steps of: determining an actual attitude angle of the road vehicle; determining a desired attitude angle; and changing the steering angle of the rear wheels based on the difference between the actual attitude angle and the desired attitude angle.

19 Claims, 5 Drawing Sheets

(56) References Cited

U.S. PATENT DOCUMENTS

| | | | |
|---|---|---|---|
| 2009/0287377 A1* | 11/2009 | Nakamura | B62D 6/04 701/42 |
| 2009/0319114 A1* | 12/2009 | Takenaka | B60T 8/1755 701/48 |
| 2011/0054736 A1 | 3/2011 | Giers et al. | |
| 2013/0131927 A1* | 5/2013 | Ishihara | B62D 6/00 701/43 |
| 2013/0231799 A1 | 9/2013 | Kimura et al. | |
| 2015/0336607 A1 | 11/2015 | Inoue | |

FOREIGN PATENT DOCUMENTS

| | | |
|---|---|---|
| EP | 1 136 344 A2 | 9/2001 |
| WO | WO 2014/115262 A1 | 7/2014 |

\* cited by examiner

Fig. 5

METHOD TO CONTROL A ROAD VEHICLE WITH STEERING REAR WHEELS WHEN DRIVING ALONG A CURVE

TECHNICAL FIELD

The present invention relates to a method to control a road vehicle with steering rear wheels when driving along a curve.

PRIOR ART

Four-wheel steering vehicles, otherwise called 4WS ("four wheel steering") vehicles, have been on the market for many years although the models in circulation are not many and mostly are based on passive mechanical systems which allow for giving the rear wheels "fixed" steering angles. In such passive mechanical systems, the rear wheels are coupled to the front wheels to give said rear wheels fixed steering angles when the front wheels are steered.

More modern systems of the dynamic type and equipped with an active (electric or hydraulic) actuator controlled by an electronic control unit allow for controlling the steering of the rear wheels by giving said rear wheels steering angles that can be varied within a predetermined range (determined by the mechanical limits of the steering mechanism).

When driving along a curve at high speed (e.g. over 60 km/h), the steering of the rear wheels allows the stability of the vehicle to be increased, in particular just before losing grip; to improve the stability of the vehicle when driving along a curve at high speed, the rear wheels are steered in phase (i.e. in a direction concordant with the steering of the front wheels and, thus, when the front wheels steer to the right also the rear wheels will steer to the right) in order to reduce the yaw angle, making it easier to control the vehicle itself. In other words, the steering in phase of the rear wheels allows for counteracting the centrifugal force which tends to make the rear axle skid in a curve and, therefore, the rear axle conforms to the ideal trajectory for the benefit of stability and effectiveness. In this situation, the rear wheels are steered with a steering angle usually less than 2° and dependent on the steering angle of the front wheels.

In case of low-speed manoeuvring (for example up to 60 km/h), the steering of the rear wheels allows the turning radius to be considerably reduced; in particular, to increase the manoeuvrability of the vehicle at low speeds, the rear wheels are steered in counterphase (i.e. in the opposite direction with respect to the steering of the front wheels and, thus, when the front wheels steer to the right, the rear wheels will steer to the left and vice versa) with a maximum steering angle of 3-5° and dependent on the steering angle of the front wheels.

Figure 3:
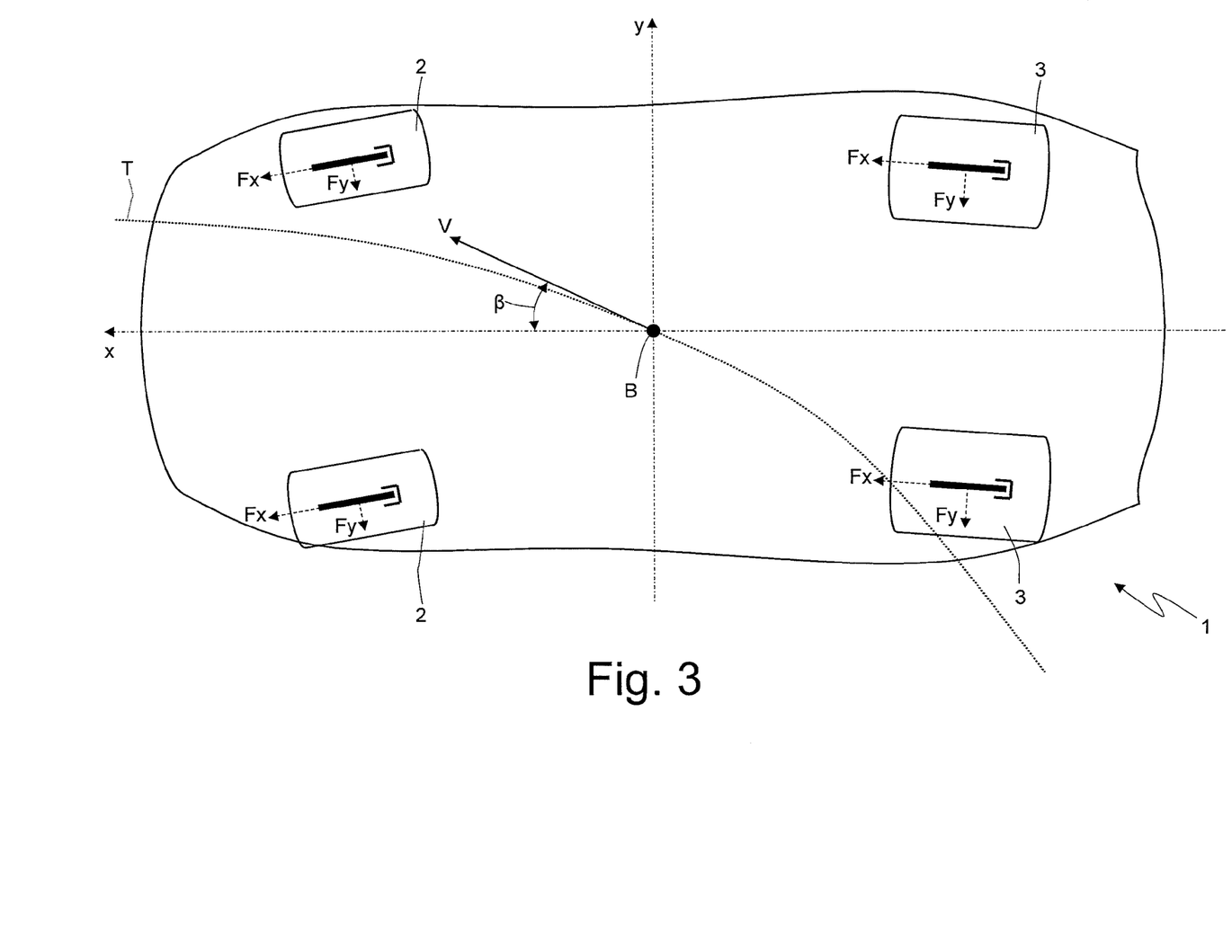
FIG. 3 is a schematic view of the road vehicle of FIG. 1 when driving along a curve, which shows the trajectory, the running speed and the attitude angle.
Figure 4:
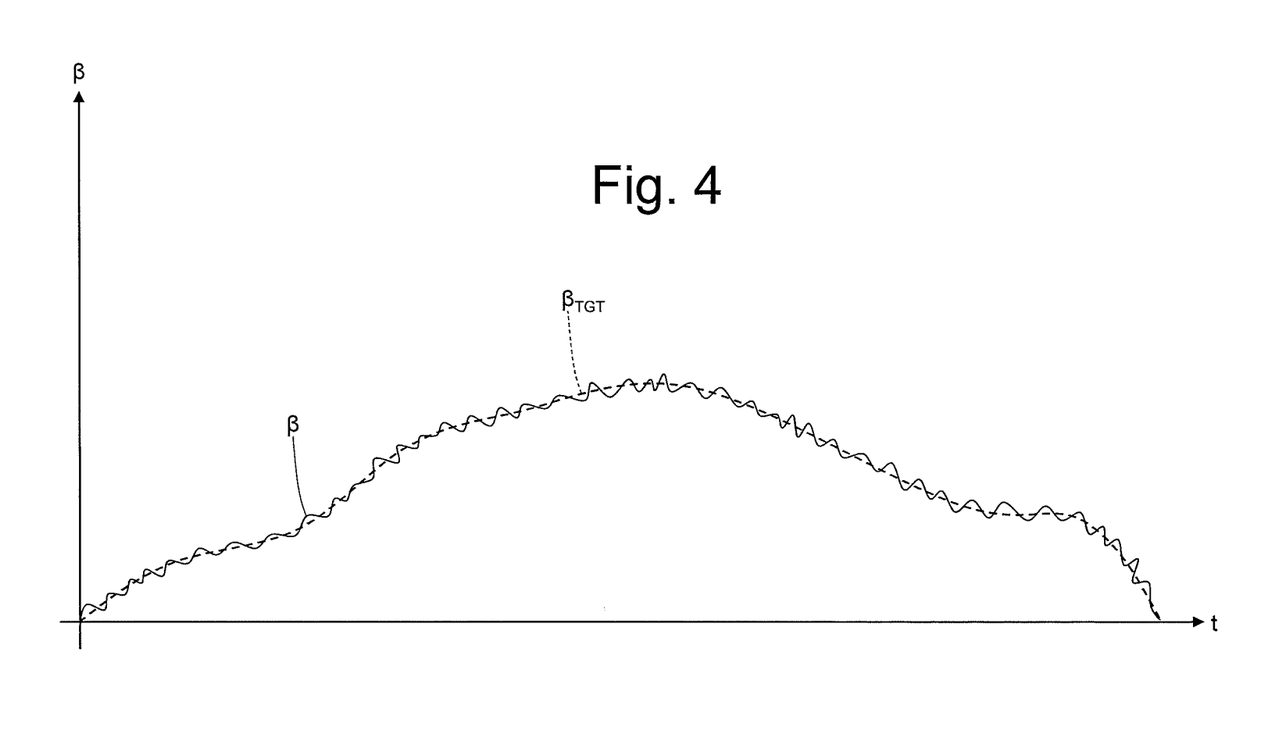
FIG. 4 is a graph showing the progress in time of the actual attitude angle and the desired attitude angle when driving along a curve.

The patent application EP1136344A2 discloses a method to control a road vehicle with steering rear wheels when driving along a curve; the control method comprises the steps of: determining a target bending radius (blocks 201 and 303 in FIGS. 3 and 4); determining a target centre of curvature (blocks 202 and 304 in FIGS. 3 and 4); and varying the steering angle of the front wheels and the rear wheels to follow the target bending radius and the target centre of curvature (blocks 203 and 305 in FIGS. 3 and 4). To determine the X coordinate of the target centre of curvature, the yaw angle is used (i.e. the angle between the longitudinal axis of the vehicle and a fixed ground reference) which is determined by using a suitable sensor.

The U.S. Pat. No. 5,799,745A1 and patent application EP0728644A2 disclose a method to control a road vehicle with steering rear wheels when driving along a curve; the control method provides for varying the steering angle of the rear wheels according to the yaw angle (i.e. the angle between the longitudinal axis of the vehicle and a fixed ground reference).

SUMMARY OF THE INVENTION

The object of the present invention is to provide a method to control a road vehicle with steering rear wheels when driving along a curve, which control method allows the performance when driving along a curve to be maximised without making the road vehicle unsteady and which, at the same time, is also easy and inexpensive to manufacture.

According to the present invention, a method to control a road vehicle with steering rear wheels when driving along a curve is provided, as claimed in the appended claims.

BRIEF DESCRIPTION OF THE DRAWINGS

The present invention will now be described with reference to the accompanying drawings, which illustrate a non-limiting embodiment thereof, in which.

PREFERRED EMBODIMENTS OF THE INVENTION

Figure 1:
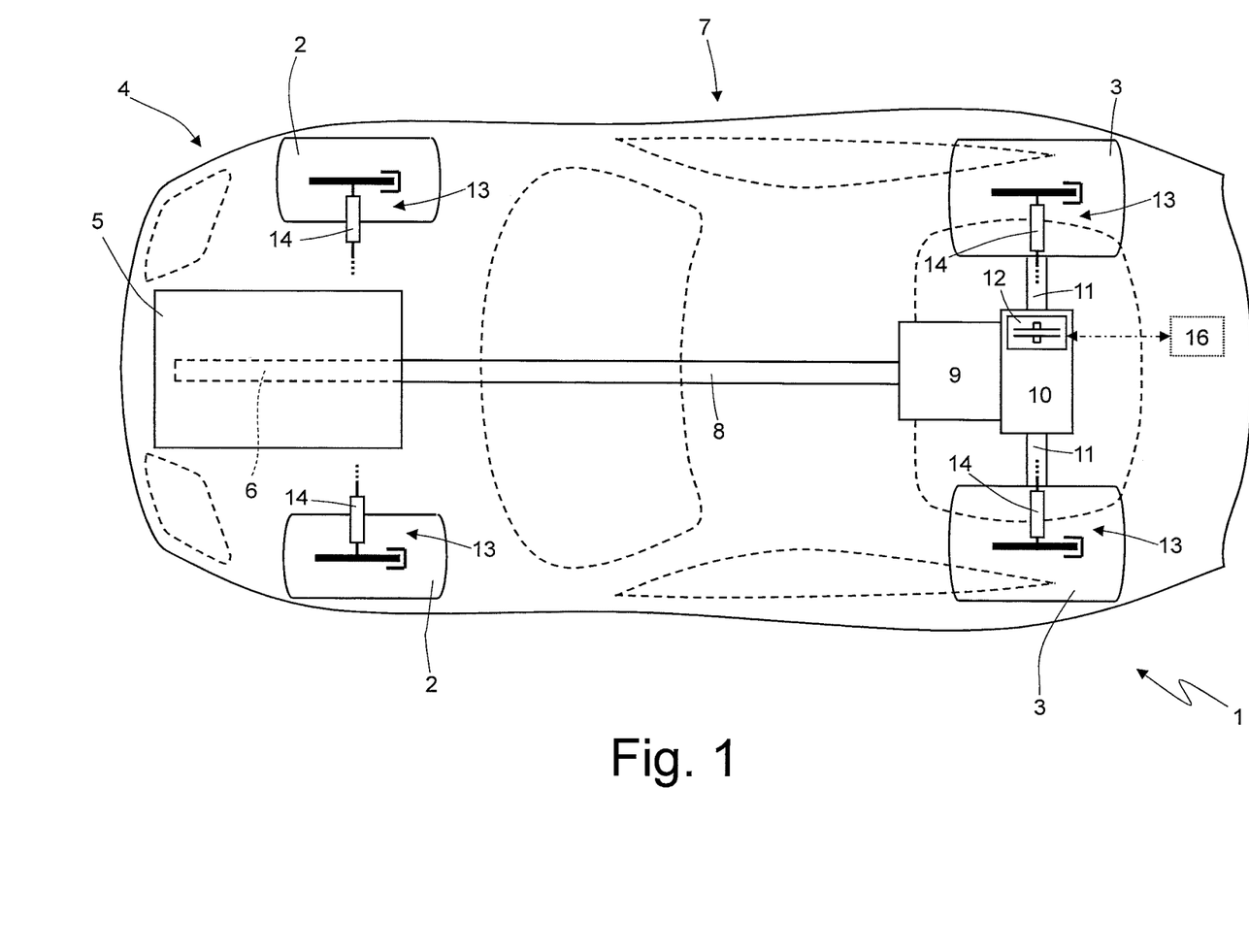
FIG. 1 is a schematic plan view of a road vehicle equipped with an electronically controlled self-locking differential and with steering rear wheels that are controlled in accordance with the present invention.

In FIG. 1, the numeral 1 indicates, as a whole, a road vehicle equipped with two front wheels 2 and two rear driving wheels 3, which receive the driving torque from a powertrain system 4.

The powertrain system 4 comprises an internal combustion heat engine 5, which is arranged in a front longitudinal position and is provided with a drive shaft 6, and a servo-controlled transmission 7, which transmits the drive torque generated by the internal combustion engine 5 to the rear driving wheels 3 and has a configuration designated as "transaxle". The transmission 7 comprises a transmission shaft 8 which on one side is connected to the drive shaft 6 and on the other side is mechanically connected to a gearbox 9, which is provided with at least one clutch and is arranged in a rear longitudinal position. The gearbox 9 is cascade-connected with an electronically controlled self-locking differential 10, from which a pair of axle shafts 11 come out, each of which is integral with a respective rear driving wheel 3. The electronically controlled self-locking differential 10 comprises a box-like body, a bevel gear pair which is housed inside the box-like body and transmits the drive torque to the two axle shafts 11, and a locking clutch 12 adapted to adjustably lock an axle shaft 11 with respect to the box-like body. When the locking clutch 12 is fully open (i.e. the locking rate is equal to zero), the self-locking differential 10 is completely free and the drive torque is equally distributed between the two rear driving wheels 3 (i.e. each rear driving wheel 3 receives 50% of the total drive torque regardless of its rotation speed); by closing the locking clutch 12 (or by increasing the locking rate), the self-locking differential 10 starts locking and the drive torque is progressively increased towards the rear driving wheel 3 that rotates more slowly (i.e. the rear driving wheel 3 that rotates more slowly receives a higher drive torque compared to the rear driving wheel 3 that rotates faster).

Each wheel 2 or 3 is mechanically connected to the chassis of the road vehicle 1 by means of a suspension 13 (partially illustrated in FIG. 1), which is provided with an electronically controlled shock absorber 14, i.e. provided with an actuator which allows for varying (i.e. increasing or decreasing) the damping of the electronically controlled shock absorber 14. By way of example, the electric actuator of each electronically controlled shock absorber 14 may comprise one or more solenoid valves that modulate the size of oil passage holes inside the electronically controlled shock absorber 14, or may comprise a magnetorheological fluid whose physical properties change as a function of an applied magnetic field.

Figure 2:
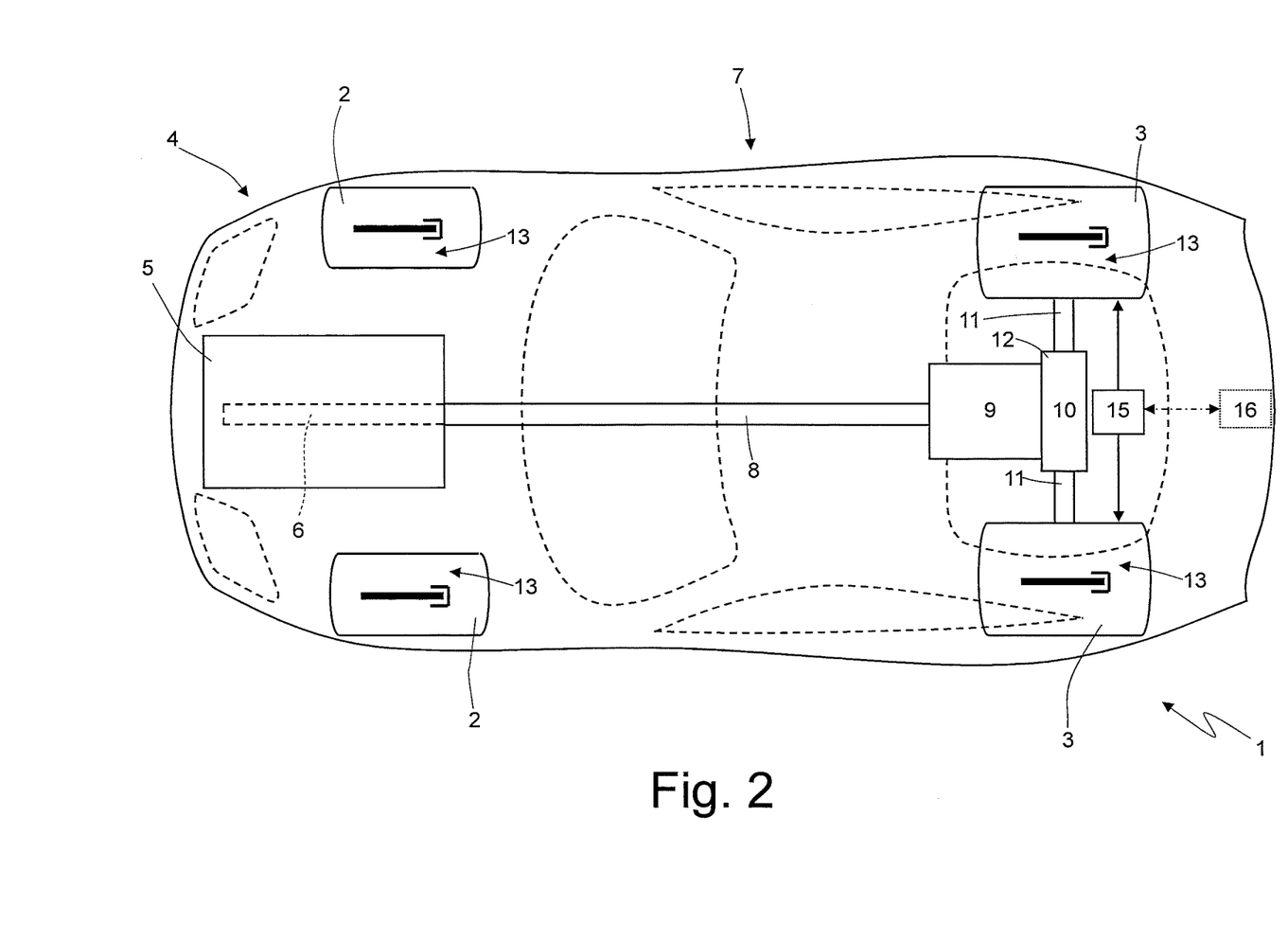
FIG. 2 is a further schematic plan view of the road vehicle of FIG. 1, which shows a steering mechanism of the rear wheels.

As shown in FIG. 2, the rear driving wheels 3 are steerable, i.e. are held by the corresponding suspensions 13 so as to be able to rotate together (i.e. with the same degree of rotation) to the right or to the left around a vertical axis to change the corresponding steering angle; in particular, an (electrical or hydraulic) actuator 15 is provided, which actively controls the variation of the steering angle of the rear driving wheels 3.

When driving along a curve at high speed (e.g. over 60 km/h), the steering of the rear driving wheels 3 allows the stability of the road vehicle 1 to be increased, in particular, to improve the stability of the road vehicle 1 when driving along a curve at high speed, the rear driving wheels 3 are steered in phase (i.e. in a direction concordant with the steering of the front wheels 2 and, thus, when the front wheels 2 steer to the right also the rear driving wheels 3 will steer to the right). In other words, the steering in phase of the rear driving wheels 3 allows for counteracting the centrifugal force which tends to make the rear axle skid in a curve and, therefore, the rear axle conforms to the ideal trajectory for the benefit of stability and effectiveness. In this situation, the rear driving wheels 3 are steered with a steering angle usually less than 2° and dependent on the steering angle of the front wheels 2 (i.e. the greater the steering angle of the front wheels 2, the greater the steering angle of the rear driving wheels 3).

In case of low-speed manoeuvring (for example up to 60 km/h), the steering of the rear driving wheels 3 allows the turning radius to be considerably reduced; in particular, to increase the manoeuvrability of the road vehicle 1 at low speeds, the rear driving wheels 3 are steered in counterphase (i.e. in the opposite direction with respect to the steering of the front wheels 2 and, thus, when the front wheels 2 steer to the right, the rear driving wheels 3 will steer to the left and vice versa) with a maximum angle of 3-5° and dependent on the steering angle of the front wheels 2 (i.e. the greater the steering angle of the front wheels 2, the greater the steering angle of the rear driving wheels 3).

The road vehicle 1 comprises an electronic control unit 16 ("ECU") which, among other things, controls the behaviour of the road vehicle 1 when driving along a curve by acting, as better described below, on the self-locking differential 10 (i.e. on the locking clutch 12 of the self-locking differential 10), on the shock absorbers 14 of the suspensions 13, and on the actuator 15 to control the steering angle of the rear driving wheels 3. Physically, the control unit 16 can be composed of a single device or of multiple devices separate from each other and communicating through the CAN network of the road vehicle 1.

As shown in FIG. 3, when driving along a curve, the control unit 16 determines, in a known manner, the actual attitude angle β of the road vehicle 1 (i.e. the angle comprised between the longitudinal axis x of the road vehicle and the direction of the running speed V of the road vehicle 1 in its barycentre B). It is important to note that the attitude angle β is different from the yaw angle (i.e. the angle between the longitudinal axis x of the road vehicle 1 and a fixed ground reference), since the road vehicle 1 can take the same yaw angle in the plane, taking attitude angles β which may differ very much and vice versa.

By way of example, the control unit 16 estimates the trajectory T followed by the road vehicle 1 by using the measurements provided in real time by a triaxial gyroscope and by a satellite positioner; in particular, the trajectory T is determined by integrating twice in time the accelerations measured by the triaxial gyroscope, and the measurements provided by the satellite positioner are used to cyclically correct any position errors that occur in the integration process. In addition, the control unit 16 estimates the running speed V of the road vehicle 1 in its barycentre B by using the measurements provided in real time by the triaxial gyroscope; in particular, the speed V of the road vehicle 1 in its barycentre B is determined by integrating once in time the accelerations measured by the triaxial gyroscope (checking that the running speed V of the road vehicle 1 in its barycentre B is actually tangent to the trajectory T followed by the road vehicle 1, otherwise, in case of significant deviation, at least one further iteration of the calculation is carried out by making corrections to the parameters used).

When driving along a curve, the control unit 16 determines in real time (for example as described previously) the actual (real) attitude angle β of the road vehicle 1. Moreover, when driving along a curve, the control unit 16 determines a desired (optimal) attitude angle $\beta_{TGT}$ which allows the performance (i.e. the travelling speed around the curve) to be maximized while maintaining the road vehicle 1 in steady conditions (i.e. in complete safety).

According to an optional (but not limiting) embodiment, the control unit 16 cyclically (for example with a frequency of at least several tens of Hz) estimates (in a known manner) the grip of the wheels 2 and 3 on the roadbed, determines a bending radius of the trajectory T of the road vehicle 1 (i.e. determines a bending degree of the trajectory T), and determines a running speed V of the road vehicle 1. Based on the grip of the wheels 2 and 3 (therefore the stability of the road vehicle 1), the bending radius of the trajectory T, and the running speed V, the control unit 16 cyclically determines the desired attitude angle $\beta_{TGT}$; in particular, to determine the desired attitude angle $\beta_{TGT}$, the control unit 16 can employ a predetermined map (usually experimentally established in the design and setting-up phases of the road vehicle 1 and stored in a memory) or a mathematical model of the road vehicle 1.

When driving along a curve, the control unit 16 establishes, in open loop, an initial (starting) locking value of the self-locking differential 10 based on the desired attitude angle $\beta_{TGT}$ and subsequently corrects, if necessary, the locking of the self-locking differential 10 according to the difference between the actual attitude angle β and the desired attitude angle $\beta_{TGT}$. In particular, the control unit 16 varies the locking of the self-locking differential 10 by using a feedback control, which employs, as a feedback variable, the actual attitude angle $\beta$.

Accordingly, the control unit 16 cyclically varies the locking of the self-locking differential 10 according to the difference between the actual attitude angle $\beta$ and the desired attitude angle $\beta_{TGT}$: the locking of the self-locking differential 10 is decreased if the actual attitude angle $\beta$ is less than the desired attitude angle $\beta_{TGT}$, the locking of the self-locking differential 10 is kept constant if the actual attitude angle $\beta$ is equal to (obviously considering a certain tolerance) the desired attitude angle $\beta_{TGT}$, and the locking of the self-locking differential 10 is increased if the actual attitude angle $\beta$ is greater than the desired attitude angle $\beta_{TGT}$. The method by which the locking of the self-locking differential 10 is varied with respect to the control error (i.e. the difference between the actual attitude angle $\beta$ and the desired attitude angle $\beta_{TGT}$) may follow the classic PID (Proportional-Integral-Derivative) control mode.

According to a preferred, but not limiting, embodiment, when the actual attitude angle $\beta$ is within a predetermined neighbourhood of the desired attitude angle $\beta_{TGT}$ (i.e. when the absolute value of the difference between the actual attitude angle $\beta$ and the desired attitude angle $\beta_{TGT}$ is lower than a predetermined threshold), the control unit 16, in order to control the actual attitude angle $\beta$, no longer acts on the locking of the self-locking differential 10, but merely acts on (as better described below) the damping (i.e. the calibration) of the electronically controlled shock absorbers 14 of the suspensions 13. In other words, when the actual attitude angle $\beta$ is within a neighbourhood of the desired attitude angle $\beta_{TGT}$, in order to control the actual attitude angle $\beta$, the damping (i.e. the calibration) of the shock absorbers 14, and not the locking of the self-locking differential 10, is varied; while, when the actual attitude angle $\beta$ is not within a neighbourhood of the desired attitude angle $\beta_{TGT}$, in order to control the actual attitude angle $\beta$, the locking of the self-locking differential 10, and not the damping (i.e. the calibration) of the shock absorbers 14, is varied.

The control unit 16 calculates the rate $\beta'$ of change of the actual attitude angle $\beta$ by calculating the time derivative of the actual attitude angle $\beta$ and varies the damping (i.e. the calibration) of the electronically controlled shock absorbers 14 according to the rate $\beta'$ of change of the actual attitude angle $\beta$. In other words, based on the rate $\beta'$ of change of the actual attitude angle $\beta$, the control unit 16 varies the damping (i.e. the calibration) of the electronically controlled shock absorbers 14 to make the electronically controlled shock absorbers 14 more rigid (stiff, i.e. with a smaller damping) or more flexible (soft, i.e. with a greater damping).

If the rate $\beta'$ of change of the actual attitude angle $\beta$ is negative (and preferably higher, in absolute value, than a corresponding threshold), i.e. it tends to decrease the actual attitude angle $\beta$, the shock absorbers 14 of the rear suspensions 13 are stiffened (i.e. they are made more rigid) and optionally the shock absorbers 14 of the front suspensions 13 are made softer. In other words, in the case of a negative rate $\beta'$ of change of the actual attitude angle $\beta$, the rear axle of the road vehicle 1 is stiffened and optionally the front axle of the road vehicle 1 is made softer so as to improve the dynamic behaviour of the self-locking differential 10. Alternatively, in the case of a negative rate $\beta'$ of change of the actual attitude angle $\beta$, the damping of the front axle of the road vehicle 1 is not modified.

If the rate $\beta'$ of change of the actual attitude angle $\beta$ is positive (and preferably higher, in absolute value, than a corresponding threshold), i.e. it tends to increase the actual attitude angle $\beta$, the shock absorbers 14 of the rear suspensions 13 are made softer and optionally the shock absorbers 14 of the front suspensions 13 are stiffened (i.e. they are made more rigid). In other words, in the case of a positive rate $\beta'$ of change of the actual attitude angle $\beta$, the rear axle of the road vehicle 1 is made softer and the front axle of the road vehicle 1 is stiffened (i.e. made more rigid) so as to stabilise the road vehicle 1. Alternatively, in the case of a positive rate $\beta'$ of change of the actual attitude angle $\beta$, the damping of the front axle of the road vehicle 1 is not modified.

In summary, the control unit 16 takes the actual attitude angle $\beta$ into a neighbourhood of the desired attitude angle $\beta_{TGT}$ by acting on the locking of the self-locking differential 10; when the actual attitude angle $\beta$ is within a neighbourhood of the desired attitude angle $\beta_{TGT}$, the control unit 16 maintains the actual attitude angle $\beta$ within the neighbourhood of the desired attitude angle $\beta_{TGT}$ by acting on the damping of the electronically controlled shock absorbers 14 (which have a fast effect on the maintenance of the actual attitude angle $\beta$ as they are responsive to the rate $\beta'$ of change of the actual attitude angle $\beta$ itself). The result of the above is shown in the graph of FIG. 4, in which the evolution in time of the actual attitude angle $\beta$ (continuous line) and of the desired attitude angle $\beta_{TGT}$ (dashed line) when driving along a curve (at the beginning and at the end of the curve the road vehicle 1 is oriented parallel to its own trajectory T and, hence, at the beginning and at the end of the curve the actual attitude angle $\beta$ is zero) can be seen; it is noted that the actual attitude angle $\beta$ oscillates rather quickly around the desired attitude angle $\beta_{TGT}$ as a result of the action on the damping of the electronically controlled shock absorbers 14.

Moreover, when driving along a curve, and to abolish the difference between the actual attitude angle $\beta$ and the desired attitude angle $\beta_{TGT}$, the control unit 16 also varies the steering angle of the rear driving wheels 3. In other words, in order to control the actual attitude angle $\beta$ (i.e. to make the actual attitude angle $\beta$ identical to the desired attitude angle $\beta_{TGT}$), the control unit 16, besides acting on the locking of the self-locking differential 10 and on the damping (calibration) of the shock absorbers 14 as described previously, also acts on the steering angle of the rear driving wheels 3.

When driving along a curve, the control unit 16 establishes, in open loop, an initial (starting) value of the steering angle of the rear driving wheels 3 based on the steering angle of the front wheels 2 (imposed by the driver through the steering wheel), and subsequently corrects, if necessary, the steering angle of the rear wheels 3 according to the difference between the actual attitude angle $\beta$ and the desired attitude angle $\beta_{TGT}$.

When driving along a curve, the control unit 16 establishes beforehand whether the road vehicle 1 is in steady conditions or in unsteady conditions. Preferably, the control unit 16 establishes that the road vehicle 1 is in steady conditions if the rate $\beta'$ of change of the actual attitude angle $\beta$ (i.e. the first derivative in time of the actual attitude angle $\beta$) is lower than a limit value PLEA, and establishes that the road vehicle 1 is in unsteady conditions if the rate $\beta'$ of change of the actual attitude angle $\beta$ is higher than the limit value $\beta_{LIM}$; obviously, the comparison between the rate $\beta'$ of change of the actual attitude angle $\beta$ and the limit value $\beta_{LIM}$ is done with a certain hysteresis to avoid too many frequent changes among the steady and unsteady conditions when the rate $\beta'$ of change of the actual attitude angle $\beta$ is close to the limit value $\beta_{LIM}$.

According to other embodiments, the control unit 16 may establish whether the road vehicle 1 is in steady conditions or in unsteady conditions in other ways; for example, the control unit 16 may establish whether the road vehicle 1 is in steady conditions or in unsteady conditions according to the transverse jerk (i.e. based on the derivative of the transverse acceleration with respect to time) and, in particular, by comparing the transverse jerk with a corresponding limit value.

When the road vehicle 1 is in steady conditions and the desired attitude angle $\beta_{TGT}$ indicates a tendency to re-alignment (to maximise the longitudinal velocity), the control unit 16 changes the steering angle of the rear driving wheels 3 according to the difference between the actual attitude angle $\beta$ and the desired attitude angle $\beta_{TGT}$; in particular, when the road vehicle 1 is in steady conditions and the desired attitude angle $\beta_{TGT}$ indicates a tendency to re-alignment, the control unit 16 decreases the steering angle of the rear driving wheels 3 (i.e. straightens the rear driving wheels 3) in order to direct the actual attitude angle $\beta$ towards the objective described by the angle $\beta_{TGT}$ that tends to zero. In particular, the desired attitude angle $\beta_{TGT}$ indicates a tendency to re-alignment when the desired attitude angle $\beta_{TGT}$ is zero or close to zero (i.e. decreasing towards zero); more generally, the desired attitude angle $\beta_{TGT}$ indicates a tendency to re-alignment when the desired attitude angle $\beta_{TGT}$ shows a decreasing trend (i.e. tends to zero) and is less than the actual attitude angle $\beta$.

Preferably, the control unit 16 varies the steering angle of the rear driving wheels 3 by using a feedback control, which employs, as a feedback variable, the actual attitude angle $\beta$. Consequently, when the road vehicle 1 is in steady conditions and the desired attitude angle $\beta_{TGT}$ indicates a tendency to re-alignment, the control unit 16 decreases the steering angle of the rear driving wheels 3 according to the difference between the actual attitude angle $\beta$ and the desired attitude angle $\beta_{TGT}$. The method by which the steering angle of the rear driving wheels 3 is decreased with respect to the control error (i.e. the difference between the actual attitude angle $\beta$ and the desired attitude angle $\beta_{TGT}$) may follow the classic PID (Proportional-Integral-Derivative) control mode.

Otherwise, when driving along a curve, during acceleration and braking, and when the road vehicle 1 is in boundary conditions of stability (i.e. in non-steady conditions), the control unit 16 determines a new desired attitude angle $\beta_{TGT}$ according to a predetermined stability criterion and increases the steering angle of the rear driving wheels 3 based both on the difference between the actual attitude angle $\beta$ and the desired attitude angle $\beta_{TGT}$, and on the rate $\beta'$ of change of the actual attitude angle $\beta$ (i.e. the higher the rate $\beta'$ of change of the actual attitude angle $\beta$, the greater the increase in the steering angle of the rear wheels 3. Preferably, in this case too, the control unit 16 varies the steering angle of the rear driving wheels 3 by using a feedback control, which employs, as a feedback variable, the actual attitude angle $\beta$.

When driving along a curve, during acceleration and braking, and when the road vehicle 1 is in boundary conditions of stability (i.e. in non-steady conditions), the control unit 16 can also evaluate the possibility of using the longitudinal (braking or driving) forces applied to the rear driving wheels 3 to increase the lateral stability of the road vehicle 1, by exploiting the (longitudinal/transverse) orientation in the X-Y plane of the rear driving wheels 3; this evaluation is carried out by comparing the ability of the tire to generate a force in the two directions (longitudinal and lateral) with the engagement of the tire itself determined by the motion conditions. In relation to the fact that the longitudinal force can be oriented favourably, the control unit 16 increases the steering angle of the rear driving wheels 3 to find the best exploitation, along the transverse direction of the road vehicle 1, of the forces available on the rear axle. In other words, the control unit 16 determines the longitudinal force and the lateral force acting on each rear driving wheel 3 when driving along the curve and, if useful, varies the steering angle of the rear driving wheels 3 so as to give each rear driving wheel 3 an orientation on the longitudinal/lateral plane which allows the lateral force acting on the rear driving wheel 3 to be maximised, even at the expense of the longitudinal force acting on the rear driving wheel 3 itself (i.e. it agrees to transmit less longitudinal force as long as it can maximise the transverse force transmission). In other words, the control unit 16 evaluates the possibility of using a portion of the longitudinal force acting on the rear driving wheels 3 to increase the transverse force acting on the rear driving wheels 3 by orienting the rear driving wheels 3 themselves in the X-Y plane, by changing the steering angle of the rear driving wheels 3.

Importantly, the action on the steering angle of the rear driving wheels 3 synergistically combines with the action on the locking of the self-locking differential 10 and on the damping (calibration) of the shock absorbers 14 to allow for following, with extreme precision and without appreciable oscillations, the desired attitude angle $\beta_{TGT}$ (i.e. the actual attitude angle $\beta$ is always equal to, unless non-significant and non-oscillatory deviations are detected, the desired attitude angle $\beta_{TGT}$). In this way, the performance can be maximised when driving along a curve (i.e. the travelling speed around the curve is maximised) without making the road vehicle 1 unsteady, since the desired attitude angle $\beta_{TGT}$ is precisely determined to achieve the goal of maximum performance without risks. In particular, the actual attitude angle $\beta$ is mainly adjusted by acting on the locking of the self-locking differential 10 and on the damping (calibration) of the shock absorbers 14, while the action on the steering angle of the rear driving wheels 3 allows the action on the locking of the self-locking differential 10 and on the damping (calibration) of the shock absorbers 14 to be made more efficient and effective. In other words, changing the steering angle of the rear driving wheels 3 allows the self-locking differential 10 and the shock absorbers 14 to affect the actual attitude angle $\beta$ more readily and more effectively, thus allowing the difference between the actual attitude angle $\beta$ and the desired attitude angle to be minimised.

According to the embodiment shown in FIGS. 1 and 2, the rear wheels 3 are driving wheels, while the front wheels 2 are always trailer wheels (i.e. no drive torque transmission is provided to the front wheels 2). According to the embodiment illustrated in FIG. 5, a secondary insertable transmission line 17 is provided, which is adapted to temporarily connect the drive shaft 6 also to the front wheels 2, so as to temporarily turn also the front wheels 2 themselves into driving wheels. The secondary transmission line 17 comprises a pair of secondary clutches 18, each of which is directly coupled to a respective front wheel 2; in particular, each secondary clutch 18 is coaxial with the respective front wheel 2 and has an output which is keyed to an axle shaft 19 of the respective front wheel 2. The secondary transmission line 17 comprises a bevel gear pair 20 to transmit the motion from the drive shaft 5 to the secondary clutches 18 and is devoid of the front differential whose function is performed by the secondary clutches 18 (in other words, a possible difference in rotation speed between the two front wheels 2 is compensated for by a corresponding difference in the slippage of the two secondary clutches 18).

Figure 5:
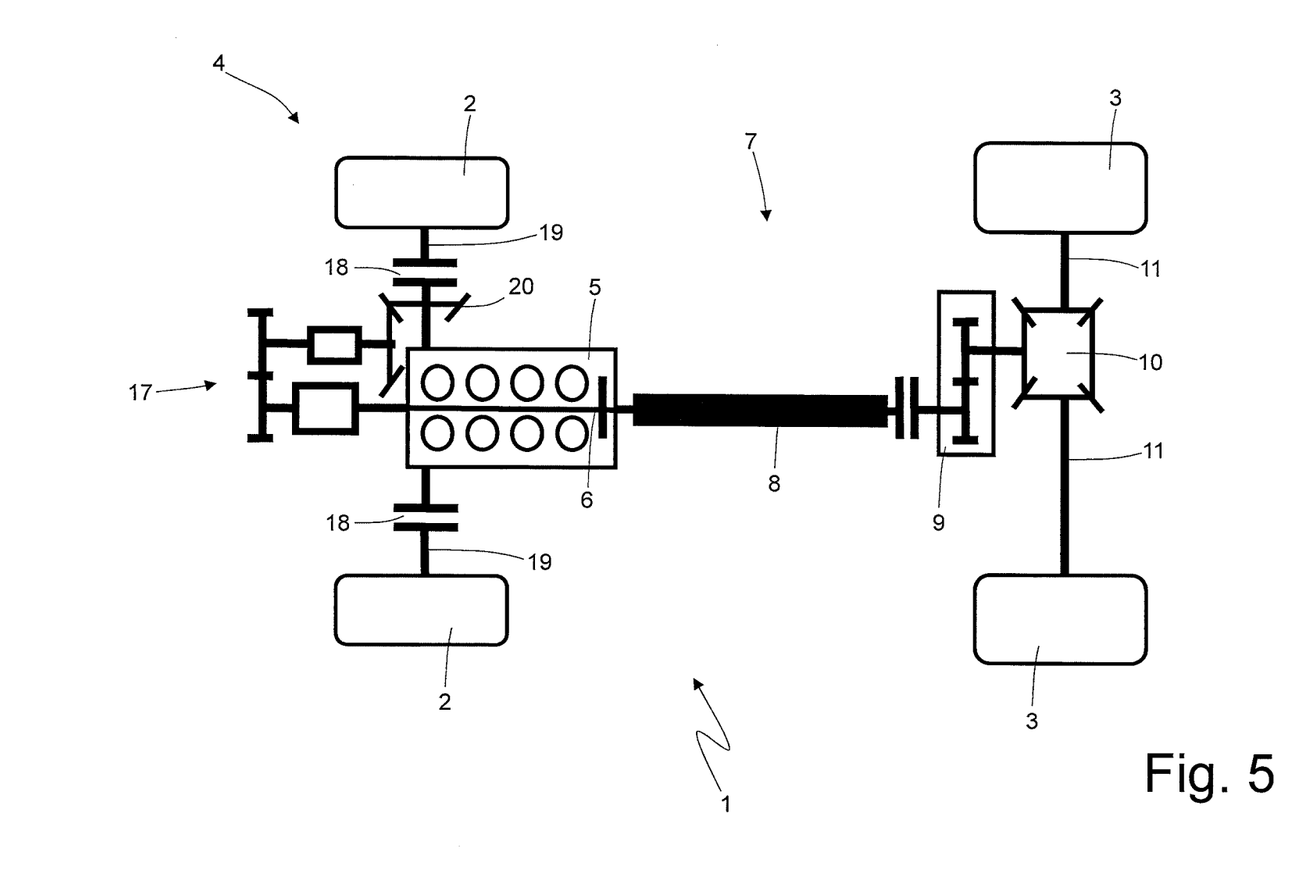
FIG. 5 is a further schematic plan view of a variant of the road vehicle of FIG. 1 provided with a drive that can be fitted to the front wheels.

The two secondary clutches 18 of the secondary transmission line 17 allow for operating the so-called "torque vectoring", i.e. they allow the drive torques applied to the two front wheels 2 to be differentiated. In use, the electronic traction control transfers part of the drive torque generated by the internal combustion heat engine 5 only when the rear driving wheels 3 begin to lose grip (i.e. they begin to slip); that is, the electronic traction control transfers to the front wheels 2 the excess drive torque that the rear driving wheels 3 fail to deliver to the ground (obviously, if the front wheels 2 begin to slip too, the electronic traction control splits the drive torque generated by the internal combustion heat engine 5).

When the road vehicle 1 is in steady conditions and entering a curve and the actual attitude angle $\beta$ is less than the desired attitude angle $\beta_{TGT}$, the control unit 16 controls the secondary clutches 18 to increase the drive torque transmitted to the front wheel 2 on the outside of the curve (i.e. to decrease the drive torque transmitted to the front wheel 2 on the inside of the curve); in other words, when the road vehicle 1 is in steady conditions and entering a curve and the actual attitude angle $\beta$ is less than the desired attitude angle $\beta_{TGT}$, the control unit 16 transfers the drive torque from the front wheel 2, on the inside of the curve, to the front wheel 2, on the outside of the curve, in order to ensure that the front wheel 2 on the outside of the curve receives a higher drive torque than the front wheel 2 on the inside of the curve. Preferably, the greater the difference between the actual attitude angle $\beta$ and the desired attitude angle $\beta_{TGT}$, the greater the difference in drive torque distribution to the front wheels 2 (obviously in favour of the front wheel 2 on the outside of the curve); by way of example, an experimentally determined map could be used, which provides for the drive torque distribution between the front wheels 2 according to the difference between the actual attitude angle $\beta$ and the desired attitude angle $\beta_{TGT}$.

When the road vehicle 1 is in unsteady conditions, the drive torque distribution on the front wheels 2 is kept balanced (i.e. 50% on the front wheel 2 on the inside of the curve and 50% on the front wheel 2 on the outside of the curve).

Importantly, the drive torque distribution between the front wheels 2 is acted upon not only by the above-described attitude control, but also by the traction control which determines, upstream and independently of the above-described attitude control, the optimum quantity of traction torque that can be distributed to the front axle, and reduces the drive torque on a front wheel 2 when the front wheel 2 itself loses grip (the reduction in the drive torque can occur by transferring the drive torque to the other front wheel 2 or by splitting the drive torque generated by the internal combustion heat engine 5).

Importantly, the action on the drive torque distribution between the front wheels 2 synergistically combines with the action on the locking of the self-locking differential 10 and on the damping (calibration) of the shock absorbers 14 to allow for following, with extreme precision and without appreciable oscillations, the desired attitude angle $\beta_{TGT}$ (i.e. the actual attitude angle $\beta$ is always equal to, unless non-significant and non-oscillatory deviations are detected, the desired attitude angle $\beta_{TGT}$). In this way, the performance can be maximised when driving along a curve (i.e. the travelling speed around the curve is maximised) without making the road vehicle 1 unsteady, since the desired attitude angle $\beta$TGT is precisely determined to achieve the goal of maximum performance without risks. In particular, the actual attitude angle $\beta$ is mainly adjusted by acting on the locking of the self-locking differential 10 and on the damping (calibration) of the shock absorbers 14, while the action on the drive torque distribution between the front wheels 2 allows the action on the locking of the self-locking differential 10 and on the damping (calibration) of the shock absorbers 14 to be made more efficient and effective. In other words, changing the drive torque distribution between the front wheels 2 allows the self-locking differential 10 and the shock absorbers 14 to affect the actual attitude angle $\beta$ more readily and more effectively, thus allowing the difference between the actual attitude angle $\beta$ and the desired attitude angle $\beta$TGT to be minimised.

According to a further, non-illustrated embodiment, the road vehicle 1 is devoid of an electronically controlled self-locking differential 10 and of electronically controlled shock absorbers 14 and, therefore, in order to control the actual attitude angle $\beta$, the electronic control unit 16 can only act on the steering angle of the rear driving wheels 3 (if the rear driving wheels 3 are steerable) and/or on the drive torque distribution on the front wheels 2 (if the front wheels 2 are driving wheels).

The control method described above has many advantages.

Firstly, the control method described above allows the performance when driving along a curve to be maximised (i.e. it allows the travelling speed around the curve to be maximised) without making the road vehicle 1 unsteady (i.e. approaching boundary conditions of stability of the road vehicle 1 while still maintaining an adequate safety margin).

Furthermore, the control method described above is particularly safe, as it always keeps the road vehicle 1 under control and is always able to intervene rapidly and effectively in case of need.

Lastly, the control method described above is simple and inexpensive to manufacture in a road vehicle 1 provided with an electronically controlled self-locking differential, since it does not require the addition of any physical components (i.e. the system hardware is not modified in any way), but is fully achievable via software. Importantly, the control method described above does not imply high computing capacity, nor an extensive amount of memory and, therefore, its implementation is possible in a known control unit without the need for updates or upgrades.

The invention claimed is:

1. A method to control a road vehicle with steering rear wheels when driving along a curve; the control method comprises the steps of:
   determining an actual attitude angle ($\beta$) of the road vehicle, wherein the attitude angle ($\beta$) is the angle between the longitudinal axis (x) of the road vehicle and the direction of the running speed (V) of the road vehicle in its barycentre (B);
   determining a desired attitude angle ($\beta_{TGT}$);
   changing the steering angle of the rear wheels based on the difference between the actual attitude angle ($\beta$) and the desired attitude angle ($\beta_{TGT}$);
   determining whether the road vehicle is in steady conditions or in non-steady conditions;
   determining whether the desired attitude angle ($\beta_{TGT}$) indicates a tendency to re-alignment; and
   decreasing the steering angle of the rear wheels when the desired attitude angle ($\beta_{TGT}$) indicates a tendency to re-alignment and only if the road vehicle is in steady conditions.

2. A control method according to claim 1, wherein the decrease in the steering angle of the rear wheels depends on the difference between the desired attitude angle ($\beta_{TGT}$) and the actual attitude angle ($\beta$).

3. A control method according to claim 1 and comprising the further step of determining that the desired attitude angle ($\beta_{TGT}$) indicates a tendency to re-alignment when the desired attitude angle ($\beta_{TGT}$) is zero or close to zero.

4. A control method according to claim 1 and comprising the further step of increasing the steering angle of the rear wheels if the road vehicle is in non-steady conditions.

5. A control method according to claim 4, wherein the increase in the steering angle of the rear wheels depends on the difference between the desired attitude angle ($\beta_{TGT}$) and the actual attitude angle ($\beta$).

6. A control method according to claim 4, wherein the higher the rate ($\beta'$) of change of the actual attitude angle ($\beta$) in time, the greater the increase in the steering angle of the rear wheels.

7. A control method according to claim 1, wherein, when the road vehicle is in steady conditions, the steering angle of the rear wheels is changed by using a feedback control, which employs, as a feedback variable, the actual attitude angle ($\beta$).

8. A control method according to claim 1 and comprising the further steps of:
calculating the rate ($\beta'$) of change of the actual attitude angle ($\beta$) by calculating the time derivative of the actual attitude angle ($\beta$); and
determining whether the road vehicle is in steady conditions or in non-steady conditions based on the rate ($\beta'$) of change of the actual attitude angle ($\beta$).

9. A control method according to claim 8 and comprising the further steps of:
establishing that the road vehicle is in steady conditions if the rate ($\beta'$) of change of the actual attitude angle ($\beta$) is lower than a limit value ($\beta$LIM); and
establishing that the road vehicle is in steady conditions if the rate ($\beta'$) of change of the actual attitude angle ($\beta$) is higher than the limit value ($\beta$LIM).

10. A control method according to claim 1 and comprising the further steps of:
determining the longitudinal force and the lateral force acting upon each rear wheel when driving along a curve; and
changing the steering angle of the rear wheels so as to give each rear wheel an orientation on the longitudinal/lateral plane which allows the lateral force acting on the rear wheel to be maximised, even at the expense of the longitudinal force acting on the rear wheel itself.

11. A control method according to claim 1 and comprising the further steps of:
determining whether the road vehicle is in steady conditions or in non-steady conditions; and
increasing the driving torque transmitted to the outer front wheel with respect to the curve, consequently decreasing the driving torque transmitted to the inner front wheel with respect to the curve when the road vehicle is in steady conditions and entering a curve and the actual attitude angle ($\beta$) is smaller than the desired attitude angle ($\beta_{TGT}$).

12. A control method according to claim 11, wherein the greater the difference between the actual attitude angle ($\beta$) and the desired attitude angle ($\beta_{TGT}$), the greater the difference in the torque distribution to the front wheels.

13. A control method according to claim 11 and comprising the further step of keeping the torque distribution to the front wheels balanced when the road vehicle is in non-steady conditions.

14. A control method according to claim 1, wherein the step of determining the desired attitude angle ($\beta_{TGT}$) comprises the further steps of: estimating a grip of the wheels of the road vehicle; determining a bending radius of a trajectory of the road vehicle; determining a running speed of the road vehicle; and determining the desired attitude angle ($\beta_{TGT}$) by using a predetermined map or a mathematical model of the road vehicle and based on the grip of the wheels, the bending radius of the trajectory, and the running speed.

15. A control method according to claim 1, wherein: the rear wheels are driving wheels and receive the motion through an electronically controlled self-locking differential; and the locking of the self-locking differential is changed based on the difference between the actual attitude angle ($\beta$) and the desired attitude angle ($\beta_{TGT}$).

16. A control method according to claim 15, wherein:
the locking of the self-locking differential is decreased, if the actual attitude angle ($\beta$) is smaller than the desired attitude angle ($\beta_{TGT}$);
the locking of the self-locking differential is kept constant, if the actual attitude angle ($\beta$) is equal to the desired attitude angle ($\beta_{TGT}$); and
the locking of the self-locking differential is increased, if the actual attitude angle ($\beta$) is greater than the desired attitude angle ($\beta_{TGT}$).

17. A control method according to claim 15 and comprising the further steps of:
calculating the rate ($\beta_{TGT}$) of change of the actual attitude angle ($\beta$) by calculating the time derivative of the actual attitude angle ($\beta$); and
changing the damping of electronically controlled shock absorbers of suspensions of the road vehicle based on the rate ($\beta'$) of change of the actual attitude angle ($\beta$).

18. A control method according to claim 17, wherein:
when the actual attitude angle ($\beta$) is in a neighborhood of the desired attitude angle ($\beta_{TGT}$), the damping of the shock absorbers is changed and the locking of the self-locking differential is not changed; and
when the actual attitude angle ($\beta$) is not in a neighborhood of the desired attitude angle ($\beta_{TGT}$), the damping of the shock absorbers is not changed and the locking of the self-locking differential is changed.

19. A control method according to claim 17, wherein:
if the rate ($\beta'$) of change of the actual attitude angle ($\beta$) is negative, namely it tends to decrease the actual attitude angle ($\beta$), the shock absorbers of the rear suspensions are stiffened; and
if the rate ($\beta'$) of change of the actual attitude angle ($\beta$) is negative, namely it tends to decrease the actual attitude angle ($\beta$), the shock absorbers of the front suspensions are made softer.

* * * * *